United States Patent Office 2,785,190
Patented Mar. 12, 1957

2,785,190
VINYL ALKYL ISOTHIOCYANATES AND THEIR PREPARATION

Hein L. Klopping, Wilmington, Del., assignor to E. I. du Pont de Nemours and Company, Wilmington, Del., a corporation of Delaware No Drawing. Application February 25, 1954,
Serial No. 412,660

9 Claims. (Cl. 260—454)

This invention relates to vinyl alkyl isothiocyanates containing a central sulfur atom, to a method for preparing them, and to fungicidal and insecticidal compositions containing them as active ingredients. More particularly, the invention is directed to vinyl mercapto alkyl isothiocyanates, vinyl sulfinyl alkyl isothiocyanates, and vinyl sulfonyl alkyl isothiocyanates.

The compounds of my invention can be represented by the following formula:

1. 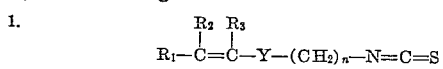

where $R_1$, $R_2$ and $R_3$ can be the same or different and represent hydrogen or an alkyl radical containing from 1 to 3 carbon atoms, Y is a divalent sulfur-containing group of the class consisting of S, SO, and $SO_2$, and $n$ is an integer of from 2 to 6.

These compounds have some unique physical and biological properties. For example, in contrast to the bisisothiocyanates of the prior art, the sulfides, sulfoxides and sulfones of the present invention are readily soluble in such inexpensive solvents as ethylene chloride, methylene chloride, acetone, methyl ethyl ketone, and benzene.

At concentrations higher than those which afford complete control of fungal diseases of plants and crops, the compounds of my invention exert an unusual type of herbicidal activity. Leaves treated with my novel compounds dehydrate and collapse but remain green. Consequently, the compounds are of use as pre-harvest dehydrating or wilting agents for grass and grain.

Illustrative compounds of the present invention are shown below. This list, however, is not in any way limitative.

Isothiocyanic acid, 2-(vinylmercapto)ethyl ester
Isothiocyanic acid, 2-(vinylsulfinyl)ethyl ester
Isothiocyanic acid, 2-(vinylsulfonyl)ethyl ester
Isothiocyanic acid, 3-(vinylsulfonyl)n-propyl ester
Isothiocyanic acid, 2-(propenylsulfonyl)ethyl ester
Isothiocyanic acid, 2-(isopropenylsulfonyl)ethyl ester
Isothiocyanic acid, 2-(isobutenylsulfonyl)ethyl ester
Isothiocyanic acid, 5-(propenylsulfonyl)amyl ester
Isothiocyanic acid, 2-(2-methylpropenylsulfonyl)ethyl ester
Isothiocyanic acid, 2-(1,2-dimethylpropenylsulfonyl)ethyl ester
Isothiocyanic acid, 2-(1-butenylsulfonyl)ethyl ester
Isothiocyanic acid, 2-(1-methyl-1-pentenylsulfonyl)ethyl ester
Isothiocyanic acid, 2-(propenylmercapto)ethyl ester
Isothiocyanic acid, 2-(isobutenylsulfinyl)ethyl ester
Isothiocyanic acid, 2-(1-methyl-1-butenylsulfinyl)ethyl ester
Isothiocyanic acid, 6-(vinylsulfonyl)hexyl ester
Isothiocyanic acid, 4-(isobutenylsulfonyl)butyl ester
Isothiocyanic acid, 4-(1-butenylsulfinyl)butyl ester The compound of Formula 1 can be prepared from known organic compounds by any of a variety of methods. For purposes of illustration, a schematic outline of a practical method of preparing compounds where $R_1$, $R_2$ and $R_3$ are hydrogen, $n$ is 2 and Y is S, SO and $SO_2$ is shown hereafter. This method is, of course, applicable to all species falling within generic claim 1, and more about the individual steps in the generic process will appear later.

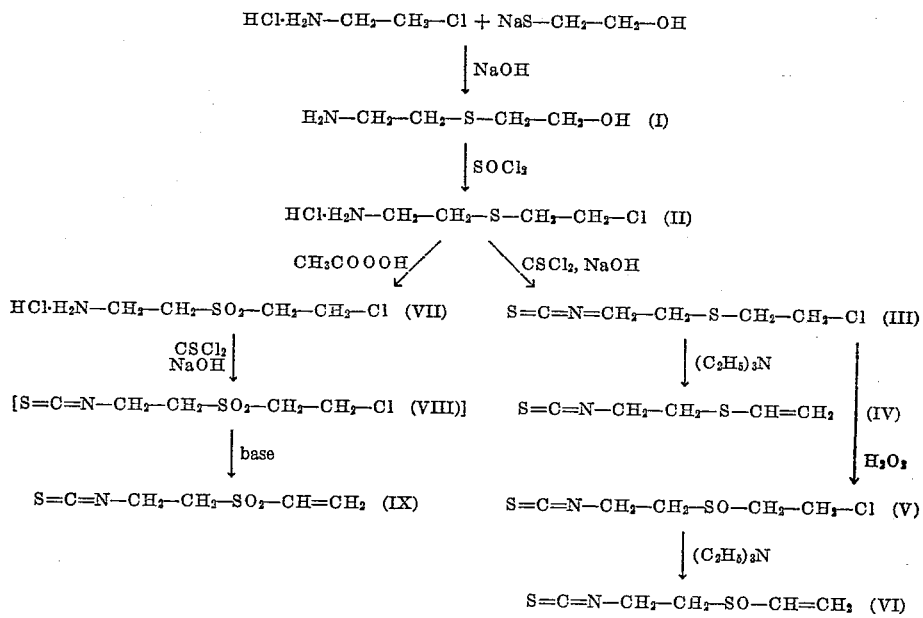

The starting materials, beta-chloroethylamine hydrochloride and beta-mercaptoethanol, and two intermediate compounds, identified above as I and II, are not novel.

Beta-chloroethylamine hydrochloride is prepared from ethanolamine and concentrated hydrochloric acid at a temperature of 150–160° C. [Ber. 38, 3130 (1905)] or from ethanolamine hydrochloride and $SOCl_2$ [J. Am. Chem. Soc. 63, 3125 (1941)]. Beta-mercaptoethanol is most conveniently prepared from ethylene oxide and hydrogen sulfide.

Intermediate I is known and is used as a solvent for extraction of hydrocarbon mixtures (U. S. 2,381,092; C. A. 39, 4892 (1945)). Intermediate II is reported in Ber. 45, 1645 as being prepared from beta-mercaptoethylamine, ethylene chlorohydrin and hydrochloric acid.

Intermediates identified above as III, V and VIII are fully described and claimed in my copending application, Serial No. 412,659, filed concurrently herewith.

The compounds identified as IV, VI and IX are within the scope of the present invention. Of these three compounds, I prefer the sulfoxide (V) over the sulfide (III), and the sulfone (VI) over the sulfoxide. Broadly speaking, I prefer the sulfones of Formula 1 over the sulfoxides and sulfides of Formula 1. The sulfides are the least preferred species. Especially preferred are the ethyl esters of the unsubstituted vinyl compounds.

As previously indicated, the same series of reactions as shown in the above scheme may be used for the preparation of the compounds of Formula 1 where $R_1$, $R_2$ and $R_3$ are alkyl groups and $n$ is an integer of 2 or more. The starting materials may be represented as follows:

2. 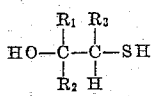

and

3. $\quad Cl-(CH_2)_nNH_2 \cdot HCl$ where $R_1$, $R_2$, $R_3$ and $n$ have the same significance as in Formula 1.

The mercapto alcohols of Formula 2 may be prepared by a variety of known methods. One method comprises refluxing the chloro compound

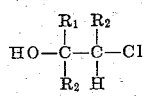

with NaSH in alcohol. An alternative method comprises the steps shown in the following diagram:

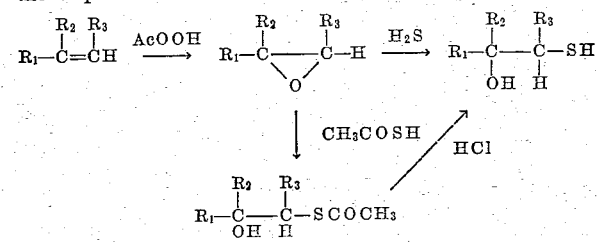

In those instances where a compound of Formula 2 is to be prepared having $R_2$ and $R_3$ hydrogen and $R_1$ alkyl, the synthesis steps are as follows:

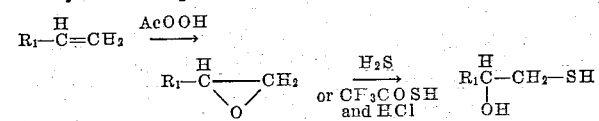

The sulfur adds exclusively to the alpha carbon atom.

Compounds of Formula 2 wherein $R_3$ is alkyl and $R_1$ and $R_2$ are hydrogen can be prepared in accordance with the scheme:

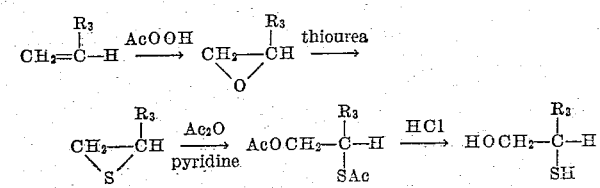

Still other methods of preparing compounds of Formula 2 involve the use of olefins of the general formulae 4. 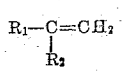

and

5. 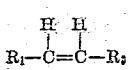

Olefins of Formula 4 yield mercapto alcohols of the formula

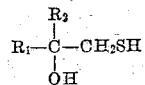

while those of Formula 5 yield a mixture of

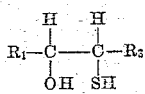

and

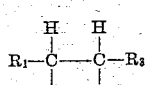

which components can be separated by distillation.

The chloroalkylamine of Formula 3 can also be prepared by one of several methods. For example, 6-chloro-1-aminohexane hydrochloride can be prepared from 1,6-dichlorohexane and potassium phthalimide.

The initial condensation between the beta-mercapto alcohol of Formula 2 is preferably effected in the presence of two equivalents of a base, such as, for example, sodium hydroxide or potassium hydroxide. One equivalent serves to neutralize the amino hydrochloride to the free amine, the second equivalent converts beta-mercaptoalkanol to its metal salt.

The condensation is preferably carried out in a solvent in which both reactants are soluble such as, for example, a lower alkanol. 95% ethanol is a particularly preferred solvent. The reaction proceeds well at the reflux temperature of ethanol. The by-product of the reaction, sodium chloride, can be removed by simple filtration.

The quantity of solvent may vary within rather wide limits but at least enough should be present such that stirring is not impeded by the precipitating sodium chloride.

The second step in my general process of preparing the products of this invention involves the replacement of a hydroxy group by chlorine. Any of several methods may be employed to effect this replacement. Compound I can, for example, be reacted with concentrated aqueous hydrochloric acid, preferably at a temperature slightly higher than the reflux temperature of concentrated hydrochloric acid, say, at about 150–160° C.

Alternatively, Compound I, or generically speaking, omega-chloroalkylaminehydrochloride, can be refluxed with thionyl chloride or phosphorus pentachloride in an organic solvent such as, for instance, chloroform. In these alternative methods protection of the free amino group by first converting it to an amine hydrochloride group by means of gaseous hydrogen chloride is advantageous but not essential.

The replacement of an amino group by an isothiocyano group is effected by use of $CSCl_2$ and NaOH. This step corresponds on the schematic diagram to the conversion of VII to VIII, and II to III. When the compound identified as VII is subjected to $CSCl_2$ and NaOH, a mixture of VIII and IX is obtained. If an excess of sodium hydroxide is used, complete dihydrohalogenation of the intermediate VIII takes place, and the product consists entirely of IX, even if the reaction is carried out at 0° C. For the preparation of Compound IX, or more generically, a vinyl sulfonyl alkyl isothiocyanate of my invention, it is not necessary to isolate the chloroalkylsulfonylalkyl isothiocyanate.

However, when Compound II or an omega-chloroalkyl-omega-aminoalkyl sulfide hydrochloride is treated with thiophosgene and base, dehydrohalogenation does not take place. Dihydrohalogenation of a —S—alkylene—Cl radical requires reflux temperatures, which can not be applied in alkaline aqueous medium since the isothiocyano group is hydrolyzed under those circumstances.

Consequently, in the preparation of vinyl mercaptoalkyl isothiocyanates, for example, Compound IV, the beta-chloroethylmercaptoalkylisothiocyanate must be isolated and subsequently dehydrohalogenated under anhydrous conditions. It will be understood that the $$-SO-CH_2-CH_2-Cl$$

group is intermediate between the corresponding sulfone and sulfide as regards ease of dehydrohalogenation.

Omega-chloroalkylsulfonylalkyl isothiocyanates, for example, the compound identified in the above scheme as VIII, can be isolated when the base used with thiophosgene is sodium bicarbonate rather than sodium hydroxide. The isolation is not essential, as already indicated, but is helpful in obtaining a sulfone of Formula 1 in high purity.

The oxidation of a sulfide of the formula $$S=C=N-(CH_2)_n-S-\underset{\underset{H}{|}}{\overset{\overset{R_3}{|}}{C}}-\underset{\underset{Cl}{|}}{\overset{\overset{R_1}{|}}{C}}-R_2$$

where $n$, $R_1$, $R_2$ and $R_3$ have the same significance as in Formula 1, to the corresponding sulfoxide is preferably effected in acetic acid using hydrogen peroxide. For optimum yield the reaction mixture should be maintained at 25–35° C., although satisfactory yields are obtained over a much wider range, say, from about 15° C. to the reflux temperature of acetic acid. It is preferred practice to dilute 30% hydrogen peroxide with approximately an equal volume of acetic acid and add this mixture dropwise to a solution of the aforementioned sulfide in acetic acid. The formation of tarry by-product can be substantially eliminated by avoiding an excess of hydrogen peroxide.

The oxidation of sulfide sulfur in a compound having the formula $$HCl \cdot H_2N-(CH_2)_n-S-\underset{\underset{H}{|}}{\overset{\overset{R_3}{|}}{C}}-\underset{\underset{R_2}{|}}{\overset{\overset{R_1}{|}}{C}}-Cl$$

to a sulfone can also be effected with hydrogen peroxide, preferably by adding the theoretical amount of hydrogen peroxide in 10% aqueous solution to an aqueous solution of the sulfide at a temperature below 40° C. The sulfone can then be reacted with thiophosgene.

The last step in the process of producing the compounds of the invention is dehydrohalogenation of an omega-chloroalkyl radical to a vinyl radical. In the case of beta-chloroethylsulfonyl radical, dehydrohalogenation occurs almost instantly in any basic medium at ordinary temperatures, say, from 20° to 45° C. Illustrative of the basic media which can be used are aqueous sodium hydroxide, calcium carbonate in water, and barium carbonate in water.

For the dehydrohalogenation of the beta-chloroethylsulfinyl radical, and more particularly, for the dehydrohalogenation of the beta-chloroethylmercapto radical, anhydrous conditions are required. Triethylamine in benzene is a satisfactory dehydrohalogenating agent for this purpose.

As indicated above, the compounds of my invention are readily soluble in chlorinated hydrocarbons such as, for instance, chloroform, methylene chloride, dichloroethane, and the like. They are also very soluble in benzene, toluene, acetone and methyl ethyl ketone. The sulfides of my invention are also soluble in aliphatic hydrocarbons, for example, n-heptane.

The compounds of the present invention are highly potent fungicides and insecticides. They are particularly useful in the control of fungus attack on seeds, plants, and vegetable crops and on other materials.

In order to better understand the nature of my invention, reference should be had to the following illustrative examples:

EXAMPLE 1

*Preparation of isothiocyanic acid, 2-(vinylmercapto)ethyl ester*

$$CH_2=CH-S-CH_2-CH_2-N=C=S$$

To a solution of 368 g. of 85% potassium hydroxide in 2 liters of 95% ethyl alcohol there are added 219 g. of beta-mercaptoethanol. The solution is stirred and refluxed as 327 g. of beta-chloroethylamine hydrochloride, dissolved in 700 ml. of 95% ethyl alcohol, are added over a period of one hour. The reaction mixture is stirred for a period of 5 hours. After the mixture is allowed to stand overnight, it is filtered. The potassium chloride on the filter is washed with alcohol, and the filtrate is combined with the washings. The alcohol is removed from the filtrate by evaporation in vacuo, and the oil residue is distilled under a high vacuum. The fraction boiling at 110–120°/0.9 mm. is collected and redistilled to give beta-aminoethyl-beta-hydroxyethyl sulfide. It is a colorless oil, B. P. 105–108°/0.15 mm., $n_D^{25}=1.5282$.

A solution of beta-hydroxyethyl-beta-aminoethyl sulfide in 1800 ml. of chloroform is stirred and heated to reflux. A solution of 357 grams of thionyl chloride in 220 ml. of chloroform is added dropwise. The reaction mixture is refluxed gently during the thionyl chloride addition. The addition takes three hours. After the reaction mixture has stood overnight, it is filtered. A solid is collected on a filter, washed with chloroform, and dried. This solid, which melts at 77–79°, consists essentially of beta-chloroethyl-beta-aminoethyl sulfide hydrochloride.

A solution of 17.6 g. of beta-chloroethyl-beta-aminoethyl sulfide hydrochloride in 170 ml. of water is cooled in ice. A solution of 11.5 g. of thiophosgene in 170 ml. of chloroform is added all at once. While the resulting mixture is stirred, a solution of 12 g. of sodium hydroxide in 60 ml. of water is added dropwise—the pH of the reaction mixture being kept below 7—until the mixture no longer turns acidic on stopping the addition of base. Stirring of the reaction mixture is continued for a period of one hour. Then the chloroform layer is separated and combined with chloroform washings of the aqueous layer. The combined chloroform extract is dried over anhydrous sodium sulfate, treated with Darco, filtered and evaporated to dryness in vacuo. The oily residue is distilled in vacuo. The light yellow liquid boiling at 116–118°/1 mm. which is collected is isothiocyanic acid, 2-(2-chloroethylmercapto)ethyl ester.

*Analysis.*—Calcd. for $C_5H_8NS_2Cl$: C 33.05, H 4.43, N 7.71. Found: C 33.21, H 4.57, N 7.74.

A mixture of 18.1 g. of isothiocyanic acid, 2-(2-chloroethylmercapto)ethyl ester, 12 g. (20% excess) of anhydrous triethylamine, and 100 ml. of anhydrous benzene is refluxed on the steam bath for several days, until no more triethylamine hydrochloride separates. The mixture is filtered with suction, and the filtrate, after treatment with Darco, is vacuum concentrated to dryness. The residue, a brown oil, is extracted exhaustively with boiling chloroform. The insoluble tarry material is discarded, and the combined chloroform extracts are vacuum concentrated to dryness. The residue, a light brown oil, consists essentially of the 2-(vinylmercapto)ethyl ester of isothiocyanic acid.

EXAMPLE 2

*Preparation of isothiocyanic acid, 2-(vinylsulfinyl)ethyl ester*

$$CH_2=CH-SO-CH_2-CH_2-N=C=S$$

A solution consisting of 15 g. of isothiocyanic acid, 2-(2-chloroethylmercapto)ethyl ester (prepared as in Example 1) and 75 ml. of glacial acetic acid is stirred. A solution of 11.5 g. of 29% hydrogen peroxide in 11.5 ml. of glacial acetic acid is added dropwise over a period of one hour. The temperature of the mixture is kept at 30° C. Stirring of the mixture is continued for a period of five hours. Then the solution is vacuum concentrated to an oil. The oil crystallizes on prolonged cooling in ice. The crystals of isothiocyanic acid, 2-(2-chloroethylsulfinyl)ethyl ester are purified by dissolving in chloroform at room temperature, adding carbon tetrachloride until the solution becomes cloudy, and cooling in ice. M. P. 55–58° C.

*Analysis.*—Calcd. for $C_5H_8ONS_2Cl$: C 30.37, H 4.08, N 7.08, S 32.43. Found: C 30.72, H 4.08, N 7.18, S 32.47.

A mixture of 25 g. of isothiocyanic acid, 2-(2-chloroethylsulfinyl)ethyl ester, 15.5 g. (20% excess) of anhydrous triethylamine and 500 ml. of benzene is refluxed on the steam bath until no more triethylamine hydrochloride separates. About 14 hours of refluxing are required. The mixture is filtered with suction. The filtrate is collected, treated with Darco and vacuum concentrated to dryness. The residue, a brown oil, is exhaustively extracted with boiling ether. The insoluble tarry material is discarded and the combined ether extracts are vacuum concentrated to dryness. The residue, which is a light brown oil, is the desired product. The refractive index of this 2-(vinylsulfinyl)ethyl ester of isothiocyanic acid is $n_D^{25} = 1.5862$. Its chemical analysis is as follows:

*Analysis.*—Calcd. for $C_5H_7ONS_2$: C 37.24, H 4.38. Found: C 37.06, H 4.51.

EXAMPLE 3

*Preparation of isothiocyanic acid, 2-(vinylsulfonyl)ethyl ester*

A solution of 58 g. of beta-chloroethyl-beta-aminoethylsulfide hydrochloride (prepared as in Example 1) in 600 ml. of water is stirred and cooled in an ethanol-ice mixture. A solution of 107 ml. of 40% peracetic acid in 600 ml. of water is added dropwise, the temperature of the reaction mixture being kept below 3° C. The addition takes 75 minutes. Stirring of the reaction mixture is continued for a period of one hour at temperatures below 3° C. The temperature is allowed to rise slowly to room temperature while the mixture is stirred. This requires four additional hours. After the mixture stands overnight, it is vacuum concentrated to a syrup. This syrup is cooled in ice and rubbed with acetone until crystallization is complete. The oily crystals melt at 130–140° C. After recrystallization from 400 ml. of a 1:1 mixture of absolute alcohol and 95% ethyl alcohol, these crystals of beta-chloroethyl-beta-aminoethylsulfone hydrochloride have a melting point of 153–155° C.

*Analysis.*—Calcd. for $C_4H_{11}O_2NSCl$: C 23.08, H 5.28, N 6.73. Found: C 23.26, H 5.33, N 6.72.

A solution of 34 g. beta-chloroethyl-beta-aminoethylsulfone hydrochloride in 340 ml. of water is stirred and cooled in ice. A solution of 14 ml. of thiophosgene in 340 ml. of chloroform is added as a unit. Then a solution of 41 g. of sodium bicarbonate in 440 ml. of water is added dropwise over a period of three hours. The pH of the reaction mixture is kept below 7 at all time. The chloroform layer is separated, combined with chloroform washings of the aqueous layer, dried over anhydrous sodium sulfate, treated with Darco, filtered, and vacuum concentrated to dryness. The residue, a pale yellow oil, crystallizes on standing. The crystals are ground with n-hexane, and the hexane-crystals mix is filtered. The crystals are collected and dried. The crystalline product, isothiocyanic acid, 2-(2-chloroethylsulfonyl)-ethyl ester, melts at 53.5–4° C.

*Analysis.*—Calcd. for $C_5H_8O_2NS_2Cl$: C 28.10, H 3.73, N 6.55, S 30.31, Cl 16.59. Found: C 28.35, H 3.96, N 6.62, S 30.38, Cl 16.63.

To a solution of 16 g. of isothiocyanic acid, 2-(2-chloroethylsulfonyl)ethyl ester in 250 ml. of anhydrous benzene there is added a solution of 7.9 g. (slight excess) of anhydrous triethylamine in 50 ml. of anhydrous benzene all at once. There is some heat evolution. Triethylamine hydrochloride separates promptly. After the mixture stands for one hour, it is filtered with suction. The filtrate is vacuum concentrated to a brown oil. This oil is exhaustively extracted with boiling ether. Some insoluble, tarry material is discarded, and the combined ether extracts are vacuum concentrated to dryness. The residue, a light yellow oil, crystallizes on cooling in ice. The crystals are ground with n-hexane, filtered off and dried. M. P. 38.5–40° C. Recrystallization from ether-n-hexane raises the M. P. of the desired isothiocyanic acid, 2-(vinylsulfonyl)ethyl ester to 39.5–40° C.

*Analysis.*—Calcd. for $C_5H_7O_2NS_2$: C, 33.88, H 3.98, N 7.90. Found: C 34.28, H 4.09, N 7.95.

I claim:

1. A compound having the formula

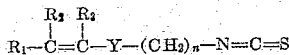

where $R_1$, $R_2$ and $R_3$ are members of the class consisting of hydrogen and alkyl radicals having from 1 to 3 carbon atoms, Y is a divalent radical of the class consisting of S, SO, and $SO_2$, and $n$ is an integer of from 2 to 6.

2. A compound of the formula

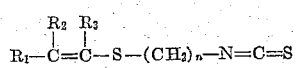

where $R_1$, $R_2$ and $R_3$ are members of the class consisting of hydrogen and alkyl radicals having from 1 to 3 carbon atoms, and $n$ is an integer of from 2 to 6.

3. A compound of the formula

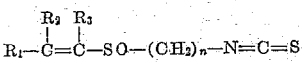

where $R_1$, $R_2$ and $R_3$ are members of the class consisting of hydrogen and alkyl radicals having from 1 to 3 carbon atoms, and $n$ is an integer of from 2 to 6.

4. A compound of the formula

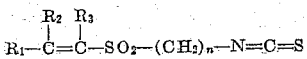

where $R_1$, $R_2$ and $R_3$ are members of the class consisting of hydrogen and alkyl radicals having from 1 to 3 carbon atoms, and $n$ is an integer of from 2 to 6.

5. Isothiocyanic acid, 2-(vinylmercapto)-ethyl ester.
6. Isothiocyanic acid, 2-(vinylsulfinyl)-ethyl ester.
7. Isothiocyanic acid, 2-(vinylsulfonyl)-ethyl ester.
8. Isothiocyanic acid, 2-(propenylsulfonyl)-ethyl ester.
9. Isothiocyanic acid, 2 - (isopropenylsulfonyl) - ethyl ester.

References Cited in the file of this patent

Schmid et al.: Chem. Abst., vol. 42, page 7249 (1948). (Copy in Sci. Library.)